US006337802B1

United States Patent
Larsson et al.

(10) Patent No.: US 6,337,802 B1
(45) Date of Patent: Jan. 8, 2002

(54) DEVICE FOR ENERGIZING A VOLTAGE-SOURCE CONVERTER

(75) Inventors: Tomas Larsson, Vasteras; Bjorn Thorvaldsson, Kolback; Bo Akesson, Smedjebacken, all of (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/807,992
(22) PCT Filed: Sep. 29, 2000
(86) PCT No.: PCT/SE00/01879
§ 371 Date: Jun. 20, 2001
§ 102(e) Date: Jun. 20, 2001
(87) PCT Pub. No.: WO01/26205
PCT Pub. Date: Apr. 12, 2001

(30) Foreign Application Priority Data

Oct. 5, 1999 (SE) .............................. 9903572

(51) Int. Cl.[7] .......................... H02H 7/125; H02M 5/42; H02M 7/217
(52) U.S. Cl. ........................... 363/127; 363/86; 363/53; 323/908
(58) Field of Search ................................ 363/125, 127, 363/84, 86, 87, 53; 323/901, 908

(56) References Cited

U.S. PATENT DOCUMENTS 5,619,127 A    4/1997  Warizaya .................... 323/275
5,644,483 A  * 7/1997  Peng et al. .................... 363/37
5,644,485 A  * 7/1997  Asplund ...................... 363/129
5,920,186 A    7/1999  Ninh et al. .................. 323/908
5,995,394 A  * 11/1999 Svensson et al. ............. 363/51

FOREIGN PATENT DOCUMENTS

JP         10-014246        1/1998
JP         10-066253        3/1998

* cited by examiner

Primary Examiner—Bao Q. Vu
(74) Attorney, Agent, or Firm—Oblon, Spivak, McClelland, Maier & Neustadt, P.C.

(57) ABSTRACT

A voltage-source converter is connected on its ac-voltage side to a three-phase electric power network via a transformer and on its dc-voltage side to capacitor equipment. The transformer has on its secondary side a first, a second, and a third phase winding, each one with a first and a second winding terminal. Resistor equipment is arranged at the transformer for limiting the current through the converter when connecting the transformer to the power network. The resistor equipment includes a first resistor, connected to the first winding terminal of the second phase winding, and switching equipment is adapted, in an initial position, to block current through the phase windings, in a transition position to form a current path which includes at least the first and the second phase windings and, in series therewith, the first resistor, which current path, when the converter is connected to the transformer, closes through the converter and the capacitor equipment, and, in an operating position, to interconnect all the first winding terminals for forming the common neutral point.

9 Claims, 3 Drawing Sheets

DEVICE FOR ENERGIZING A VOLTAGE-SOURCE CONVERTER

TECHNICAL FIELD

The present invention relates to a device for energizing a voltage-source converter, the converter being intended for connection on its ac-voltage side to a three-phase electric power network via a transformer and on its dc-voltage side to capacitor equipment, the transformer having resistor equipment for limiting the current through the converter when connecting the transformer to the power network.

BACKGROUND ART

Capacitors or capacitor equipment comprising a plurality of capacitors are used in electrical power engineering among other things for achieving, on a dc voltage network, a stable dc voltage with a low harmonic content. One example of such an application is in installations for transmission of high-voltage direct current, where so-called voltage-source converters are used for converting an ac voltage to a dc voltage, and vice versa. In these applications, the converters are connected, on their dc-voltage side, to a more or less extended and branched dc-voltage network. Another example of an application is in installations for compensation of reactive power, where such a voltage-source converter is connected, on its ac-voltage side, to an electric power network and is connected, on its dc-voltage side, to capacitor equipment only. In such installations, the converter is usually connected to the ac-voltage network via a converter station, which normally has a Y-connected secondary winding.

When installations of the above-mentioned kind are not in operation, the capacitor equipment is discharged and when resuming the operation it has to be charged again to provide a controllable function of the converters. Converters of the above-mentioned kind comprise, in a known manner, semiconductor valves with branches of series-connected semiconductor elements capable of being turned on and turned off, for example power transistors of a so-called IGBT type, and diodes antiparallel-connected thereto. The charging of the capacitor equipment to the desired voltage level, that is, the energizing of the converter, may take place by rectifying the voltage of the ac-voltage network via these diodes. Connecting full line voltage directly to the converter, however, initially results in a heavy surge through the converter in that the capacitor equipment at this stage does not exhibit any counter voltage. Admittedly, the current decays concurrently with the voltage across the capacitor equipment growing, but the loss power developed in the diodes may still be sufficient to damage the diodes. Other components in the installation are, of course, also subjected to the high current stress.

To solve the above problem, various conventional solutions may be resorted to. Thus, for example, an auxiliary transformer with a ratio of transformation different from that of the converter transformer may be connected to the dc-voltage circuit, either via a separate rectifier or via the converter, whereby a certain limitation of the initial current is obtained. However, this means that extra components have to be included in the installation, which, of course, complicates the installation and renders it more expensive. Another known method of limiting the current is to temporarily connect resistors, between the transformer and the converter, in series with each one of the phase windings of the transformer, by means of switching elements in the form of circuit breakers, which resistors thereafter, in dependence on some criterion, for example after a certain time, are bypassed. Also in this case, extra components are required, which complicates the installation and renders it more expensive.

SUMMARY OF THE INVENTION

The object of the invention is to achieve an improved device for energizing a voltage-source converter which, on its dc-voltage side, is connected to capacitor equipment, and which, particularly for the applications mentioned in the introduction, provides a simple and appropriate and thus cost-effective design of the installation.

This object is achieved by using a small number of components for solving the task and particularly by utilizing components already designed for this purpose.

In a first embodiment of the invention, in which the transformer on its secondary side has a first, a second and a third phase winding, each one with a first and a second winding terminal, respective first winding terminals for interconnection to a common neutral point, and respective second winding terminals for connection to the converter, the resistor equipment comprises a first resistor, connected to the first winding terminal of the second phase winding, and the device comprises switching equipment intended, in an initial position, to block current through the phase windings; in a transition position, to form a current path which comprises at least the first and the second phase winding and, in series with these, the first resistor, which current path, when the converter is connected to the transformer, closes through the converter and the capacitor equipment; and, in an operating position, to interconnect all the first winding terminals, to form the common neutral point.

In a second embodiment of the invention, the resistor equipment comprises, in addition thereto, a second resistor, connected to the first winding terminal at one of the first and the third phase winding, and the switching equipment comprises a changeover switch with at least two mutually synchronized three-position contact groups and with a common motor-operated drive mechanism for operating the contact groups, to form, in the transition position, current paths which comprise the above-mentioned resistors and, in series with each one of these, the phase winding to which the respective resistor is connected, which current paths, when the converter is connected to the transformer, close through the converter and the capacitor equipment, and whereby, in dependence on a start order, the drive mechanism automatically, by means of a continuous rotational movement, brings the changeover switch to move from the initial position to the operating position while passing the transition position, in which the changeover switch is situated at a time determined by the rotational movement of the drive mechanism.

One of the advantages achieved by the invention, especially compared with conventional uses of resistors and circuit breakers for current limitation which require three resistors and three circuit breakers, is that the number of components is reduced. Thus, the first embodiment of the invention requires only one resistor and three switching members, whereas in the second embodiment the necessary switching operations can be carried out with only a slightly modified standard component which, per se, also comprises an appropriate control of the switching sequence.

BRIEF DESCRIPTION OF THE DRAWINGS

The invention will be explained in greater detail by description of embodiments with reference to the accompanying schematic drawings, wherein.

DESCRIPTION OF THE PREFERRED EMBODIMENTS

Figure 1:
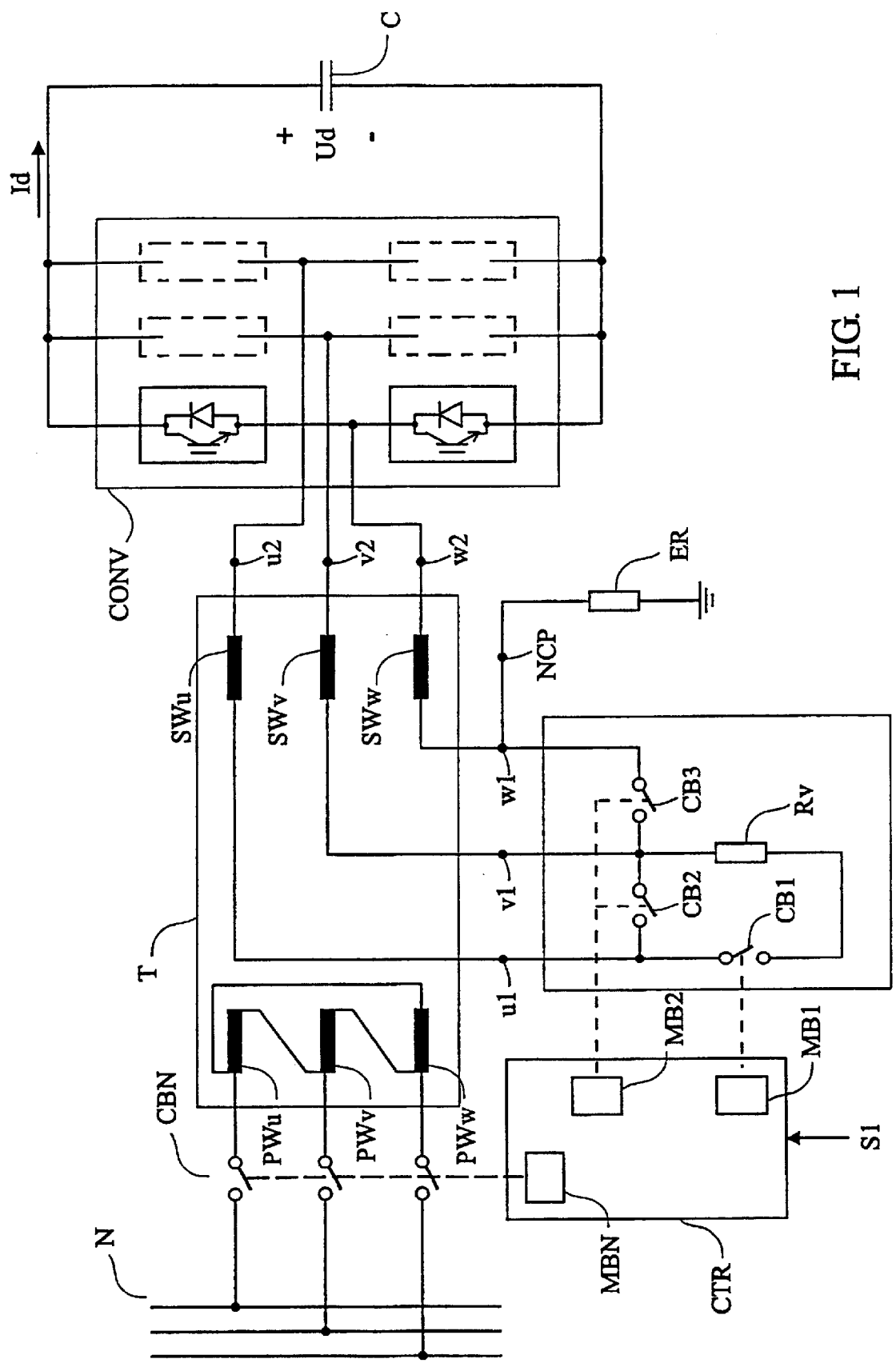
FIG. 1 shows a first embodiment of the invention.

FIG. 1 shows a voltage-source converter CONV, the ac-voltage side of which, via a transformer T and a line circuit breaker CBN, may be connected to a three-phase electric power network N with the phases PHu, PHv and PHw. The converter is of a known kind and comprises two three-phase groups of semiconductor valves, only roughly indicated in the figure. The semiconductor valves may, in a known manner, comprise branches of series-connected semiconductor elements capable of being turned on and turned off, for example power transistors of so-called IGBT type, and diodes antiparallel-connected thereto.

Voltage-source converters utilize for their function an essentially constant voltage on the dc-voltage side, which, as illustrated in the figure, usually is achieved by connecting capacitor equipment, in the figure only indicated with a capacitor C, to the dc-voltage side of the converter. The voltage across the capacitor equipment C is designated Ud and the current through the converter on the dc-voltage side thereof is designated Id.

On its primary side, the transformer has a Δ-connected three-phase winding with the primary windings PWu, PWv and PWw, respectively, and on its secondary side it has a first, a second and a third phase winding, SWu, SWv, SWw, respectively. Each one of the phase windings has a first winding terminal u1, v1, w1, respectively, and a second winding terminal u2, v2, w2, respectively.

The respective first winding terminals are intended for interconnection of the phase windings to a common neutral point NCP, such that, under normal operating conditions, the secondary winding of the transformer is Y-connected. A grounding resistor ER is connected between the winding terminal w1 and ground for resistance grounding of the neutral point for the secondary side of the transformer. The secondary winding of the transformer is connected to the converter via respective second winding terminals.

In a first embodiment of the invention, the device for energizing the converter comprises a first resistor Rv, a first switching member CB1, and a switching device with two switching members CB2 and CB3. The resistor Rv is connected, by means of one of its terminals, to the first winding terminal v1 on the phase winding SWv and, by means of its second terminal, to one of the terminals on the first switching member CB1, in the figure illustrated as a single-phase circuit breaker. The second terminal on the switching member CB1 is connected to the first winding terminal u1 on the phase winding SWu. The switching device, in the figure illustrated as two single-phase switching members CB2 and CB3, respectively, is connected at the first winding terminals such that the switching member CB2 is connected between the terminals u1 and v1 and the switching member CB3 is connected between terminals v1 and w1. The line circuit breaker CBN, the switching member CB1 and the switching device are controlled by means of operating devices MBN, MB1 and MB2, respectively, arranged in an operating unit CTR (only roughly indicated).

The mode of operation of this embodiment of the invention is as follows. In a starting position, the line circuit breaker CBN and the switching members CB1, CB2 and CB3 are all assumed to be in non-conducting state. In dependence on a start order S1, the line circuit breaker CBN is closed in a first stage. In this position, referred to in the following as the initial position, current through the phase windings is blocked by the switching members CB1, CB2 and CB3.

In a next stage, the switching member CB1 is brought into the conducting state, whereby a current path is formed which comprises the first phase winding SWu, the second phase winding SWv and, in series therewith, the resistor Rv, which current path, when the converter is connected to the transformer, closes through the converter and the capacitor equipment. In this position, referred to in the following as the transition position, the capacitor equipment is charged by the current Id, the amplitude of which thus being limited by the resistor Rv.

In the next stage, the switching members CB2 and CB3 are brought into the conducting state, whereby all first winding terminals are interconnected to form the common neutral point in a position referred to in the following as the operating position.

With knowledge of rated data for the installation, that is, for the power network, the transformer, the resistors, the converter, and the capacitor equipment, the current through the converter to the capacitor equipment, during the time the device is in the transition position, may be calculated. Thus, the time during which the device is to be in the transition position may advantageously be controlled by a time-control circuit, designed in a manner known per se and arranged in the operating unit CTR but not shown in the figure, such that, after this period of time, the installation may change into the operating position without any risk of overloading the converter.

It has been found that, in a plurality of practical applications, with a choice of resistance of the resistors which does not lead to overloading of the converter, the time taken for charging the capacitor equipment to a voltage near its nominal value is of the order of magnitude of 20 to 40 ms. This is therefore also the order of magnitude of the time during which the device should be in the transition position.

A conventionally designed on-load tap-changer, of a kind known per se, typically has an operating time from one winding stage to another of the order of magnitude of 50 ms, of which the transition period, during which current flows through its transition resistance, occupies a time of typically 20 to 30 ms. It has now proved that such an on-load tap-changer, after a simple modification which will be described in greater detail below, is advantageous for achieving the object of the invention.

Figure 2:
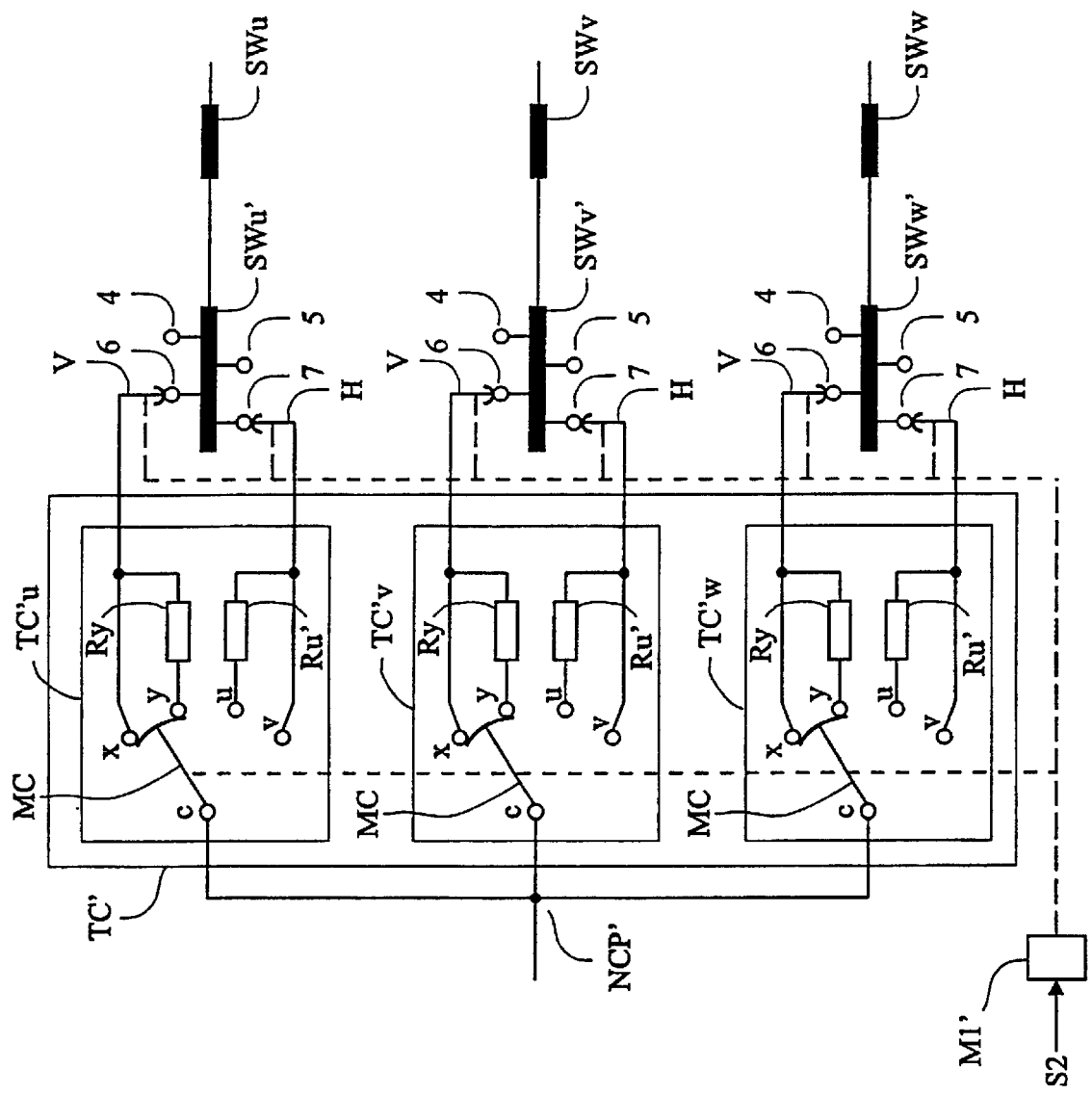
FIG. 2 shows a known embodiment of a three-phase on-load tap-changer.

FIG. 2 schematically shows a three-phase on-load tap-changer of a known kind. In series connection with each one of only roughly indicated phase windings SWu, SWv and SWw of a power transformer, regulating windings SWu', SWv' and SWw' are arranged. Each one of the regulating windings have tapping points designated 4, 5, 6 and 7 in the figure, for the sake of simplicity shown in the figure without any index indicating to which phase they belong. By moving selector contacts marked V and H, the desired part of the voltage across the regulating windings may be added to the voltage across the phase windings.

To permit a stepwise switching of the regulating winding from, for example, tapping point 6 to tapping point 5 when a load current flows through the phase windings, the switching takes place via an operating part TC with a contact group TC'u, TC'v and TC'w, respectively, for each phase. All the contact groups are operated in common and synchronized, in the figure marked by a dashed line, with the aid of a motor-operated drive mechanism M1'. For the following description of the mode of operation of the known on-load tap-changer, only the phase PHu is taken into consideration. The contact group TC'u has an input terminal c and output terminals x, y, u and v. All the input terminals are interconnected to form a neutral point NCP' which is common to the phase windings and the respective regulating windings. The output terminals x and y are connected to the selector contact V, the terminal x directly and the terminal y via a resistor Ry. The output terminals u and v are connected to the selector contact H, the terminal v directly and the terminal u via a resistor Ru'. The movable contact part MC, associated with each contact group, for connection of the input terminal to an output terminal bridges two of the mentioned output terminals except in intermediate positions which will be described in greater detail below.

In a first end position, when the tapping point 6 is connected to the neutral point NCP', the movable contact part bridges the terminals x and y, which thus results in the current flowing through the terminal x and the resistor Ry being bypassed. Switching to a position where the tapping point 5 is connected to the neutral point NCP' takes place in the following steps. The selector contact H is moved from tapping point 7 to tapping point 5 and thereafter the movable contact part is moved to a first intermediate position where the input terminal is only connected to the output terminal y. In this intermediate position, the current through the phase winding is thus limited by the resistor Ry. Thereafter, the movable contact part is moved, via a position where it bridges the terminals y and u, and thus the current through the phase winding flows through the resistor Ry as well as the resistor Ru', to a second intermediate position where the input terminal is only connected to the output terminal u. In this second intermediate position, the current through the phase winding is thus limited by the resistor Ru'. Finally, the movable contact part is moved to a second end position, where it bridges the terminals u and v, which thus results in the current flowing from the tapping point 5 through the terminal v and the resistor Ru' being bypassed.

Characteristic of the above-described operating sequence of the on-load tap-changer is that, in dependence on a start order to the drive mechanism, it is carried out automatically at a speed determined by the rotational movement of the drive mechanism, that it has two stable end positions, and that these comprise a bridging of two output terminals such that both of them are simultaneously connected to the input terminal.

Figure 3:
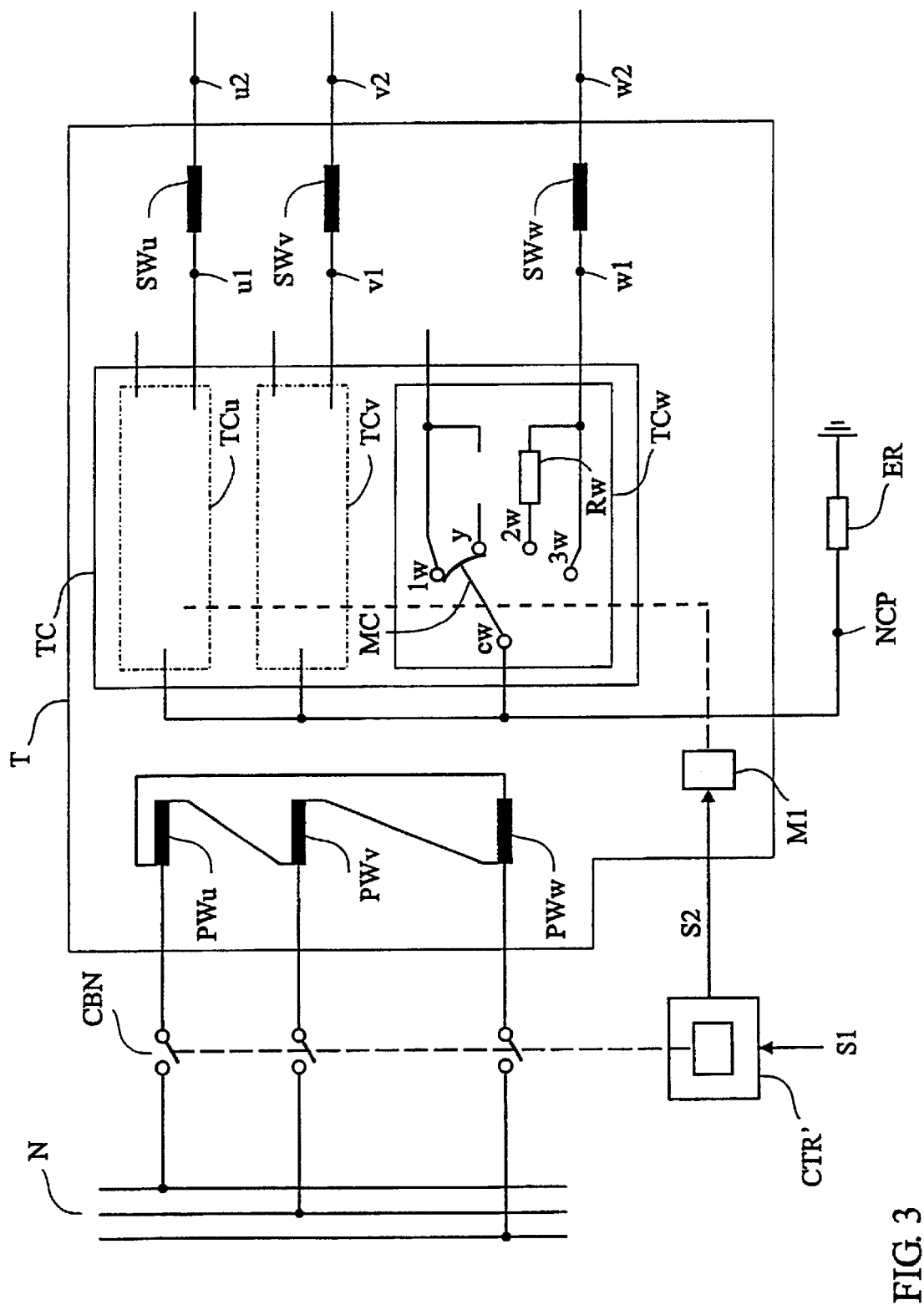
FIG. 3 shows a second embodiment of the invention.

A second embodiment of the invention is illustrated in FIG. 3, where, for reasons of space, only the phase PHw is shown in detail, but it is to be understood that at least another one, and preferably both, of the other phases are arranged in a similar manner.

A direct comparison between FIGS. 2 and 3 now shows that this embodiment of the invention may be achieved with a conventionally designed on-load tap-changer TC' according to FIG. 2, where the selector part with the contacts V and H and the regulating winding with the tapping points 5–7 have been removed and only the operating part has been retained. In addition, for each of the phases, the resistor Ry is removed in the operating part.

The input terminal c in FIG. 2 corresponds to the input terminal cw in FIG. 3 and the output terminal x in FIG. 2 corresponds to the output terminal 1w in FIG. 3. The output terminal y in FIG. 2 is without any special function once the resistor Ry has been removed. The output terminal u in FIG. 2 corresponds to the output terminal 2w in FIG. 3, whereas the output terminal v in FIG. 2 corresponds to the output terminal 3w in FIG. 3. The resistor Ru' in FIG. 2 corresponds, in FIG. 3, to the resistor Rw.

In the embodiment according to FIG. 3, the drive mechanism thus operates the contact group TCw in a continuous rotational movement such that, in the above-mentioned initial position, the input terminal cw is connected to the first output terminal 1w, in the transition position to the second output terminal 2w, and in the operating position to and bridging the second output terminal and the third output terminal 3w. The rotational movement is motor-driven via a motor-operating device and a drive mechanism of the kind which is conventionally used for on-load tap-changers of the above-mentioned kind.

The movement from the initial position via the transition position to the operating position is carried out automatically in dependence on the start order S1 which, when the line circuit breaker CBN is in the closed position, in some manner known per se, is forwarded as a start order S2 to the drive mechanism M1 of the modified on-load tap-changer. The initial position and the operating position are both stable end positions for the changeover switch whereas the rotational movement, as mentioned above, is carried out at a speed determined by the rotational movement of the drive mechanism, which means that the transition position is assumed only for a defined period of time determined by the drive mechanism.

In those embodiments of the invention where, in the manner described above, it is realized by means of a modified on-load tap-changer, this tap-changer may be physically integrated with the transformer in a conventional manner. It has also been found that the resistors, which according to the invention are utilized for a current-limiting purpose, may be of the same physical size as the transition resistances which are used in a conventional on-load tap-changer.

In typical applications of the invention, the resistance values of the resistors may lie in an interval of 0.7–7 ohms and the energy developed therein during the energization may lie within an interval of 50–500 kJ.

The invention is not limited to the embodiments shown but a plurality of modifications are feasible for the invention defined by the claims.

Thus, for example, in the embodiment described with reference to FIG. 1, the time during which the device is to be in the transition position may be controlled in dependence on a sensed current flowing through the converter and to the capacitor equipment, or on a sensed voltage across the latter, such that the transition to the operating position takes place when the current has dropped to a chosen level and the voltage has risen to a chosen level, respectively.

In the embodiments which have been described with reference to FIG. 3, it is sufficient, per se, that the contact groups and the resistors of the changeover switch are arranged in two of the three phases, which, however, in the transition position results in an unbalance current through the transformer and the converter.

The desired function of the switching devices CB1–CB3 according to FIG. 1 may, of course, also be achieved by means of semiconductor elements.

What is claimed is:

1. A device for energizing a voltage-source converter, the converter configured for connection on an ac-voltage side to a three-phase electric power network via a transformer and on a dc-voltage side to capacitor equipment, the transformer on a secondary side having a first, a second, and a third phase winding, each one with a first and a second winding terminal, respective first winding terminals for interconnection to a common neutral point, and respective second winding terminals for connection to the converter, as well as resistor equipment, arranged at the transformer, for limiting the current through the converter when connecting the transformer to the power network, wherein the resistor equipment comprises a first resistor, connected to the first winding terminal of the second phase winding, and that the device comprises switching equipment configured, in an initial position, to block current through the phase windings; in a transition position, to form a current path which comprises at least the first and the second phase winding and, in series therewith, the first resistor, which current path, when the converter is connected to the transformer, closes through the converter and the capacitor equipment; and, in an operating position, to interconnect all the first winding terminals for forming the common neutral point.

2. A device according to claim 1, wherein the switching equipment comprises a first switching member, which in the initial position is in the non-conducting state and in the transition position is in the conducting state, and, in addition thereto, a switching device which in the initial position and in the transition position is in the non-conducting state and in the operating position is in the conducting state.

3. A device according to claim 1, wherein said switching device comprises two switching members, which in the initial position and in the transition position are each in the nonconducting state, and in the operating position are each in the conducting state.

4. A device according to claim 1, wherein the resistor equipment further comprises a second resistor, connected to the first winding terminal at one of the first and the third phase windings, that the switching equipment comprises a changeover switch with at least two mutually synchronized three-position contact groups and with a common motor-operated drive mechanism for operating the contact groups, for forming current paths in a transition position which comprise said resistors and, in series with each one of these, the phase winding to which the respective resistor is connected, which current paths, when the converter is connected to the transformer, close through the converter and the capacitor equipment, whereby, in dependence on a start order, the drive mechanism automatically, by means of a continuous rotational movement, brings the changeover switch to move from the initial position to the operating position while passing the transition position, in which the changeover switch is situated at a time determined by the rotational movement of the drive mechanism.

5. A device according to claim 4, wherein the resistor equipment further comprises a third resistor, each of said resistors being connected to the first winding terminal at a respective one of the phase windings, and that the changeover switch comprises an additional three-position contact group synchronized with the other contact groups, for forming current paths in the transition position which comprise said resistors and, in series with each one of these, the phase winding to which the respective resistor is connected, which current paths, when the converter is connected to the transformer, close through the converter and the capacitor equipment.

6. A device according to claim 4, wherein each one of said contact groups has an input terminal and a first, a second, and a third output terminal, said input terminals being interconnected to form the common neutral point, said second output terminals being each connected to a respective one of said resistors, and said third output terminals being connected to respective first winding terminals at said phase windings, whereby the respective input terminals in the initial position are connected to the respective first output terminals, in the transition position to the respective second output terminals, and in the operating position to the respective third output terminals.

7. A device according to claim 6, wherein each one of said contact groups comprises a movable contact part for interconnection of the respective input terminals to said output terminals and driven by said drive mechanism, which contact part in the operating position bridges the respective second and third output terminals.

8. Transformer equipment for connection of a voltage-source converter to a three-phase ac network, the converter on its dc-voltage side being connected to capacitor equipment, comprising a device for energizing the converter according to claim 1.

9. Transformer equipment according to claim 8, wherein the device for energizing the converter comprises a drive mechanism for a on-load tap-changer.

* * * * *